United States Patent [19]
Wolf

[11] 4,009,322
[45] Feb. 22, 1977

[54] BATTERY COVER FOR FACILITATING THE DRAINING OF LIQUID FROM THE BATTERY WHEN INVERTED

[75] Inventor: Alby Henry Wolf, Minneapolis, Minn.

[73] Assignee: Gould Inc., Rolling Meadows, Ill.

[22] Filed: Nov. 17, 1975

[21] Appl. No.: 632,352

[52] U.S. Cl. .................................. 429/175; 429/95
[51] Int. Cl.² ......................................... H01M 2/04
[58] Field of Search ............. 136/170; 429/175, 95

[56] References Cited
UNITED STATES PATENTS

| | | | |
|---|---|---|---|
| 2,637,758 | 5/1953 | Shannon | 136/170 |
| 3,666,564 | 5/1972 | Corbin et al. | 136/170 |

Primary Examiner—Donald L. Walton
Attorney, Agent, or Firm—Leydig, Voit, Osann, Mayer & Holt, Ltd.

[57] ABSTRACT

On the inside of the cover for a storage battery from which liquid is to be drained when the battery is inverted and rocked from side to side upstanding ribs are disposed to concentrate and direct the liquid to the vent openings. Additional ribs may block the flow of liquid past the vent opening in one direction and, in covers where the vent openings are disposed in a recessed channel, a rib may be employed to concentrate and direct liquid over the shoulder formed by the recess when the battery is inverted.

8 Claims, 14 Drawing Figures

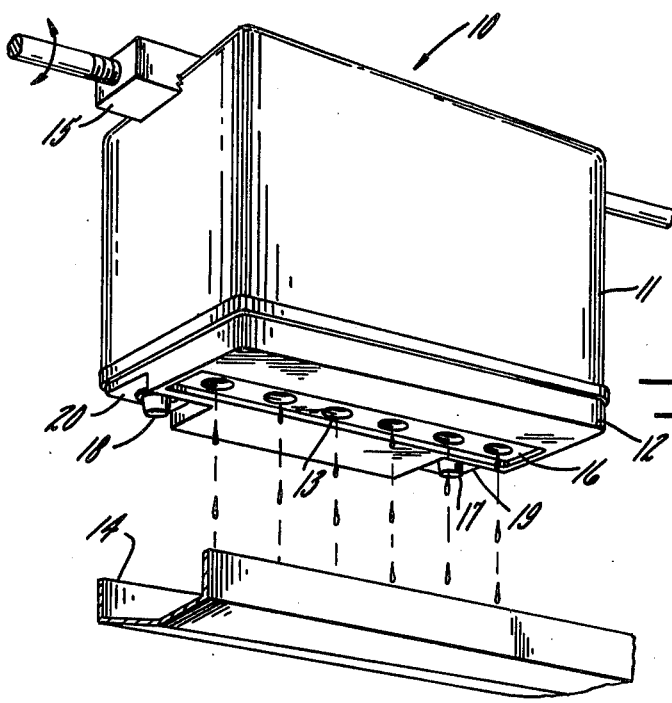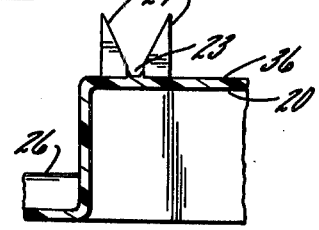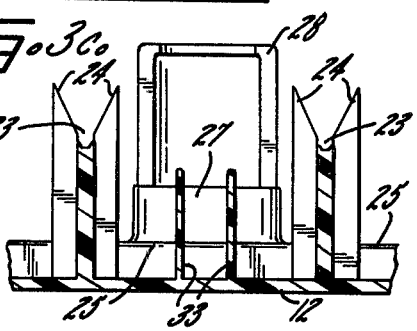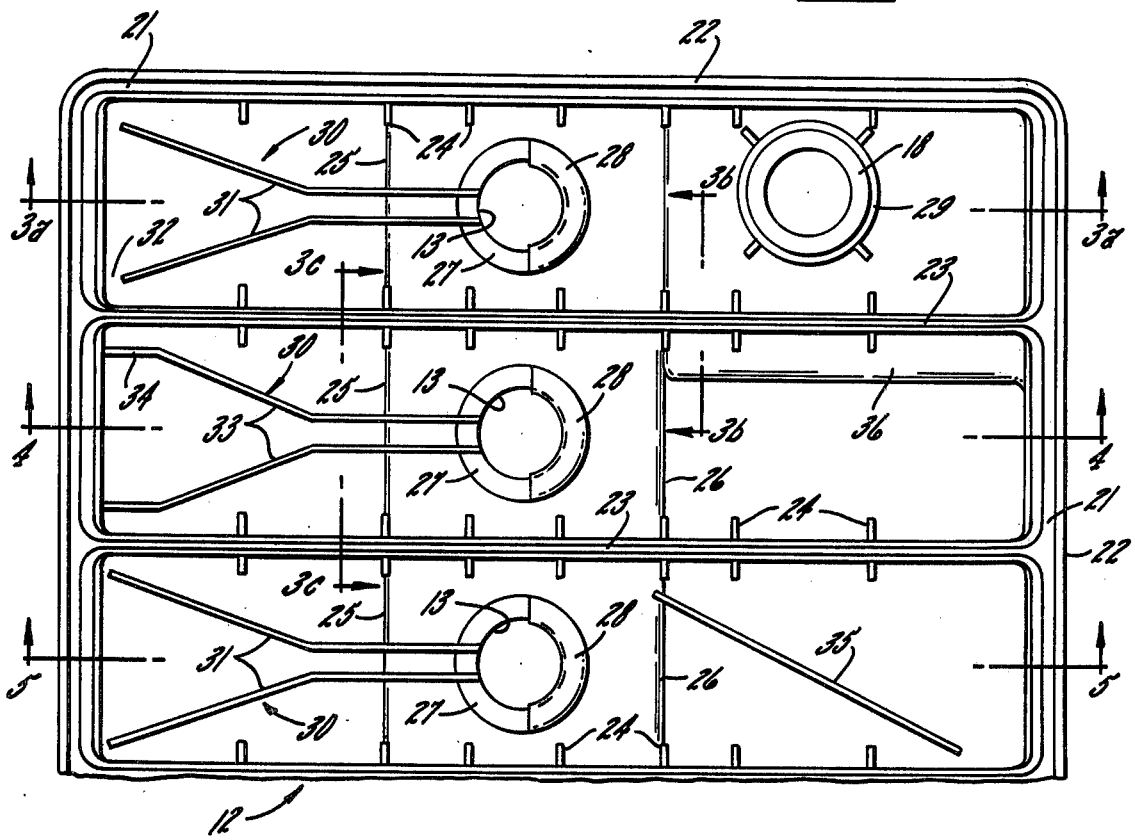

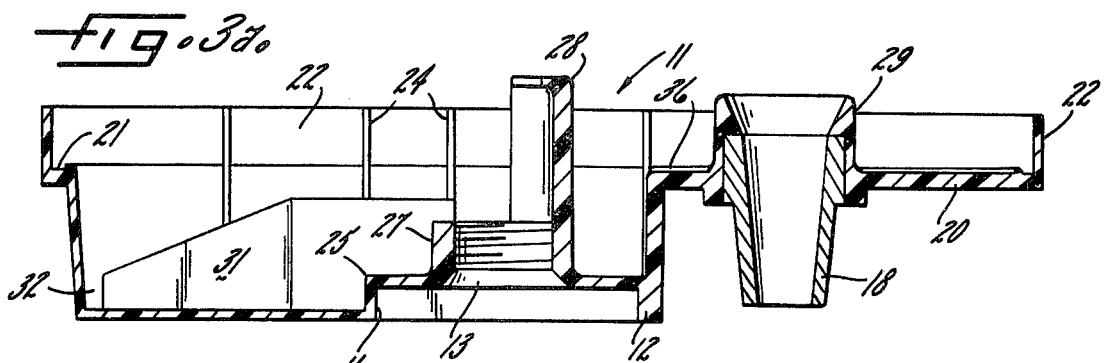
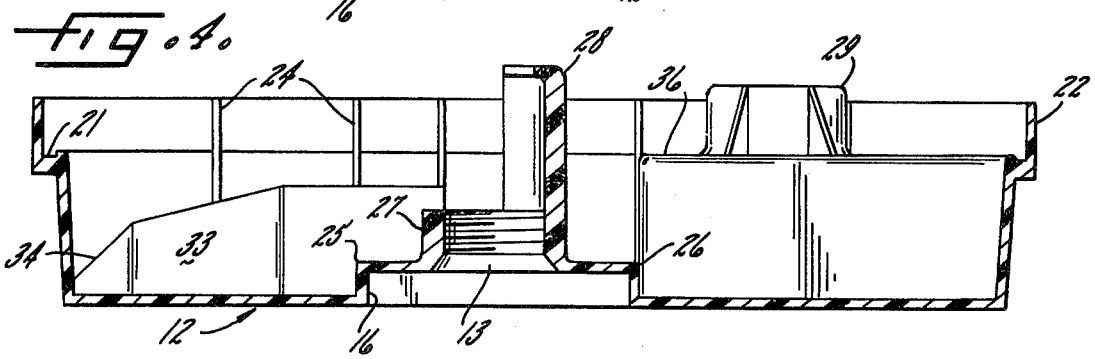
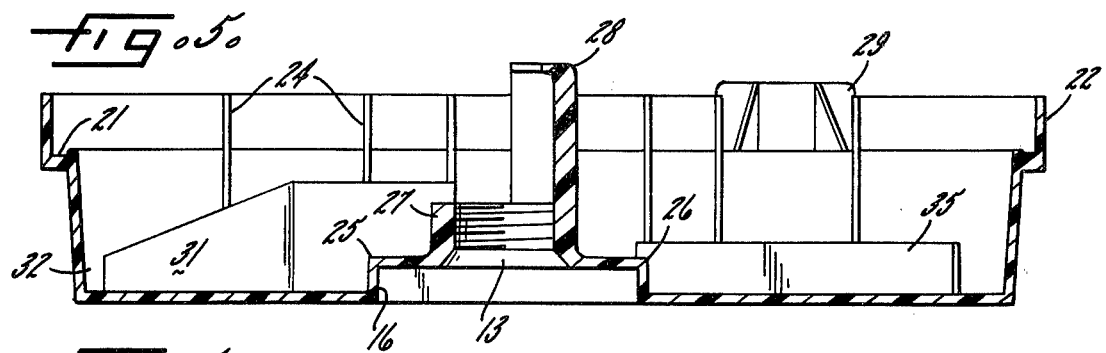
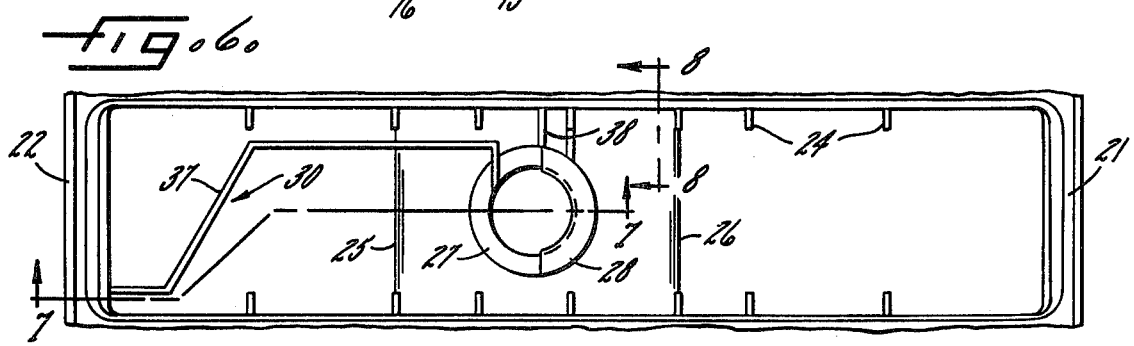
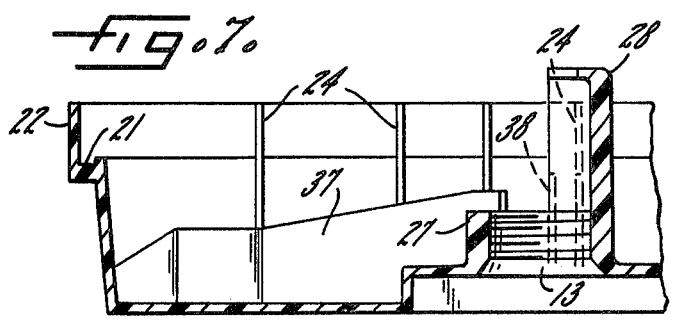
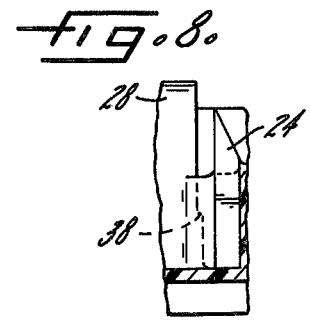

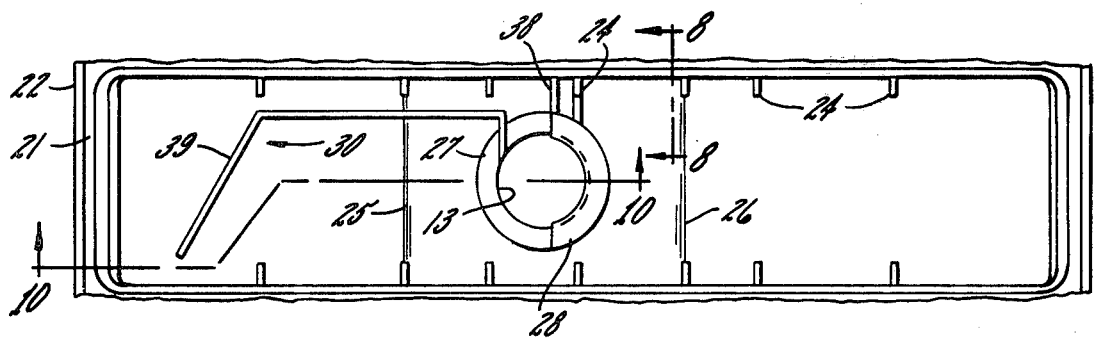
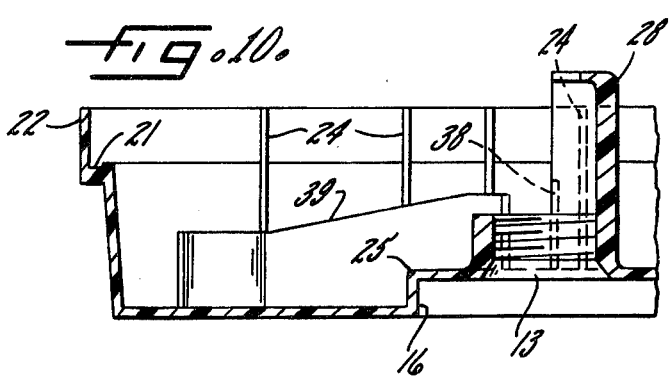
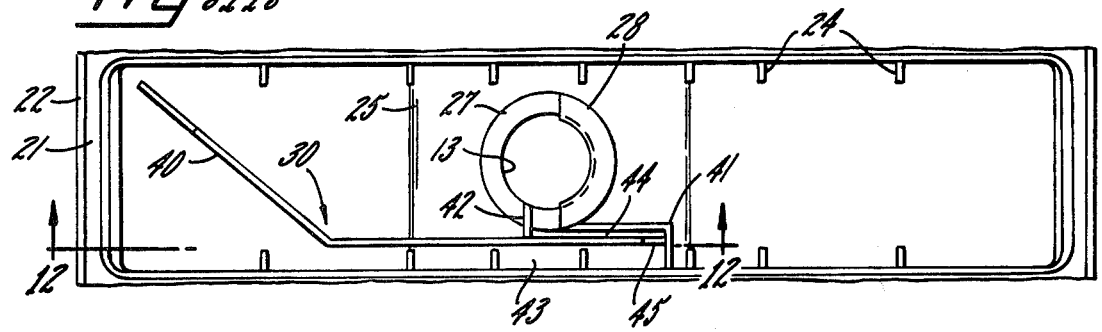
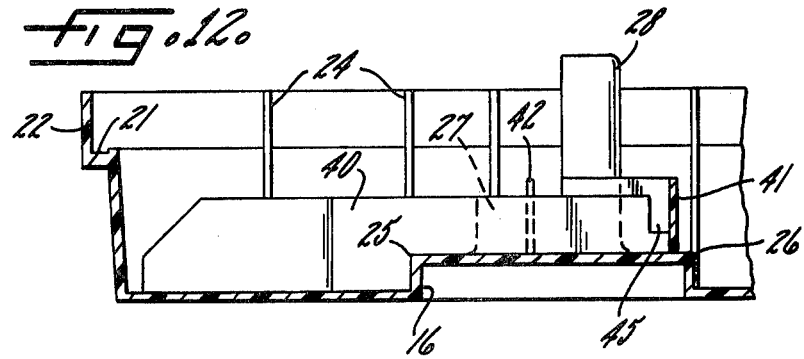

BATTERY COVER FOR FACILITATING THE DRAINING OF LIQUID FROM THE BATTERY WHEN INVERTED

The present invention relates generally to secondary batteries and more particularly concerns an improved cover for such batteries which facilitates the removal of electrolyte or other liquid from the battery when this is required.

By now, various forms of so-called dry-charge type and water activatable lead-acid batteries are relatively well known in the art. Reference may be made for example to the following copending applications for a general discussion of such batteries as well as certain improvements therein:

Sabatino, Ser. No 587,955, filed June 18, 1975, for: Water Activatable, Lead-Acid Storage Battery and Method for Manufacturing Same; and, Mao and Sabatino, Ser. No. 486,663, filed July 8, 1974, now U.S. Pat. No. 3,948,680 for: Method of Making a Lead-Acid Storage Battery, and the Battery Itself, Capable of Activation by the Addition of Electrolyte.

Generally speaking, one of the steps in making dry-charge batteries, as well as batteries of certain other types, requires removal of the electrolyte and/or other liquid, such as a rinse solution, after the battery is formed. Typically, this is done by simply inverting the battery and draining the liquid out the vent holes in the battery cover. To facilitate removal of substantially all of the free electrolyte or other liquid, the inverted battery may be placed in rocking mechanism and rocked slowly from front to back so the liquid flows back and forth over the vent hole where some drains out each cycle until it is substantially all removed. In one conventional rocking operation the front of the inverted battery is tilted up about 15° where it dwells for a short period and then the back of the battery is rocked up 15° where it dwells before the front is again tilted up to complete one cycle. A typical draining operation may involve 15 complete rocking cycles in 4 minutes will approximately half the duration of each cycle being dwell time.

Even with the use of such rocking mechanisms, however, the configuration of some battery covers, when inverted, is such that too large a volume of free electrolyte or other fluid still remains in the battery cells after the normal draining time. Typically such battery covers include a plurality of vent holes disposed in a recessed channel-like portion of the cover which presents a raised step on the inside of cover when the battery case is inverted. This raised step acts as a dam and some of the electrolyte or other fluid tends to collect at the foot of the step during the draining process. While it is desirable to leave less than 5cc of electrolyte per cell in an automotive size battery after draining, covers having the vent holes disposed in recessed channels typically retain 20cc or more electrolyte after rocking for a normal period or even an extended duration. Moreover, while increasing the rocking speed or employing a greater rocking angle facilitates the removal of retained fluid from such covers, it is still quite difficult, time-consuming and/or requires more expensive equipmment to get the retained fluid down below the 5cc level.

Accordingly, it is the primary aim of the present invention to provide a guide means on the inside of a battery cover for directing liquid to the vent openings when the battery case is inverted and rocked from side to side thereby facilitating substantially complete draining of the liquid from the battery.

It is a more particular object of the invention to provide such guide means in the form of baffles which collect, concentrate and funnel the liquid over both the stepped cover portion and the collars surrounding the vent holes on battery covers having their vent holes located in recessed channels and having collars extending into the battery case.

A still more specific object is to provide in certain embodiments of the invention, a series of baffles of the foregoing type which progressively collect and concentrate the retained liquid in smaller and smaller channels leading directly to the vent openings.

These and other objects and advantages of the invention will become apparent upon reading the following detailed description and upon reference to the drawings, in which:

FIG. 1 is a perspective view of an inverted battery schematically illustrating it being rocked from side to side as liquid drains from the vent holes into a collecting trough;

FIG. 2 is an enlarged fragmentary plan view of the inside of the battery cover illustrating three different embodiments of the present invention;

FIGS. 3a, 4 and 5 are full cross sections and FIGS. 3b and 3c are fragmentary cross sections as seen substantially along lines 3a—3a, 4—4, 5—5, 3b—3b and 3c—3c, respectively, in FIG. 1;

FIGS. 6, 9 and 11 are fragmentary bottom plan views similar to FIG. 1 of modified embodiments of the invention each for another cell; and, FIGS. 7, 8, 10 and 12 are fragmentary cross sections substantially as seen along lines 7—7 and 8—8, 10—10 and 12—12 in FIGS. 6, 9 and 11, respectively. de While the invention will be disclosed in connection with certain preferred embodiments, it will be understood that I do not intend to limit the invention to those embodiments. On the contrary, I intend to cover all alternatives, modifications and equivalents as may be included within the spirit and scope of the invention as defined by the appended claims.

Turning now to the drawings, there is shown in FIG. 1 an inverted battery 10 including a case 11 and a cover 12 having fill and vent holes 13 therein from which liquid, such as forming electrolyte or rinse solution, is being drained into a trough 14 as the battery is rocked from side to side by a suitable rocking dumper, shown schematically here at 15. The battery case 11 and cover 12 may be made of hard rubber or thin-wall plastic material such as, for example, polypropylene or ethylenepropylene copolymers and in the illustrated embodiment the vent holes 13 are disposed in a recessed, channel-like trough 16 formed in the cover 12. The battery 10 also includes positive and negative terminals 17 and 18, respectively, extending through the cover 12 in recessed areas 19 and 20 adjacent the rear corners of the battery.

The battery 10 is preferably of the lead-acid secondary type capable of activation by the addition of electrolyte or water after being stored in substantially dry condition. It will be understood that such dry-charge type and water activatable batteries, after fabrication and the addition of a forming electrolyte, have been initially charged and then substantially all of the forming electrolyte has been drained from the battery. In certain instances separate rinse solutions containing treating agents may be added and then drained from the battery. For further details concerning such dry-charge type and water activatable batteries, reference may be made to the aforementioned copending applications Ser. Nos. 587,955 and 486,663.

Referring now to FIGS. 2 and 3a it will be seen that the inverted cover 12 includes a shallow peripheral groove 21 into which the side walls of the case 11 are adapted to fit and be sealed and an upstanding flange 22 overlaps the side walls of the case. While the battery 10 shown in FIG. 1 is a six-cell automotive size battery, the present invention is not limited to the particular number of cells or the battery size. Only half of the cover 12 has been shown in FIG. 2 and it will be understood that this portion of the cover 12 includes intermediate grooves 23 which cooperate with separator walls (not shown) in the case 11 to divide the battery 10 into separate cells. Three such cell areas are shown in FIG. 2. As also shown in FIGS. 2, 3a-c and 8 the underside of the cover 12 also includes a plurality of tapered fingers 24 for guiding the walls of the case 11 into the grooves 21 and 23.

When the cover 12 is inverted, as shown in the drawings, the recess or channel 16 in which the vent holes 13 are located forms two raised step-like shoulders 25 and 26 in each of the cell areas. In the cover 12 illustrated, the vent holes 13 also include integral collars 27 and vent hole extensions 28 which project into the battery case 11. The vent hole extensions 28 permit more accurate visual inspection of the level of electrolyte in the battery cells and the collars 27, in addition to reinforcing the cover 12 at the vent holes 13, may be internally threaded for receiving the vent caps (not shown). Alternatively, the inner surface of the collars may be smooth to receive push-in type vent caps. As shown in FIG. 3a, the terminal post 18 is molded into a reinforcing integral boss 29 in the cover and, prior to placement of the cover on the case 11, the posts 17 and 18 are hollow for reception of upstanding elements (not shown) connected to the respective positive and negative plates of the battery.

In accordance with the present invention, means are provided on the inside of the cover 12 to facilitate removal of the forming electrolyte or other liquid from the battery 10 when it is inverted and rocked from side to side as in FIG. 1. It should be understood that, as used herein, the expression "side to side" means the same as front to back and, while this is across the width of the battery 10, it is the long direction of each of the individual cell areas. Simply for orientation purposes, the side of the battery 10 and cover 12 containing the posts 17 and 18 will be referred to herein as the back side and, of course, the other side is the front of the battery.

Referring now to FIG. 2, it will be seen that the cover 12 is formed with a plurality of integral guide vanes or ribs 30 for concentrating and directing the flow of liquid toward the vent holes 13. As more particularly shown in FIGS. 3a and 3c, the ribs 30 for the uppermost cell area (as seen in FIG. 2) comprise a pair of upstanding guide vanes 31 extending from adjacent one side of the cover 12, over the step 25 and into the collar 27, opposite the vent hole extension 28. As the front of the inverted battery 10 (left side of cover 12 in FIG. 2) is tilted down, the fluid flows into the V-shaped area between the vanes 31. Then as the front of the battery is rocked up, a substantial portion of the fluid is channelled between the vanes 31, over the step 25 and collar 27 and into the vent hole 13. During subsequent rocking cycles, the electrolyte or other liquid in the cell flows back and forth over the inside of the cover 12 defining the cell area. Each time the front is lowered, most of the liquid collects at the V-shaped entrance between the vanes 31 and then it is concentrated and directed up over the step 25 and collar 27 when the front is raised. After 15 cycles of alternating 15° tilts in about 4 minutes all but a very small amount (less than 5 cc) of the electrolyte is drained from the cell.

In the embodiment shown in FIG. 3a, the vanes 31 do not extend completely to the front wall of the cover 12. This leaves a small channel indicated at 32 for the liquid to flow into the area between the vanes 31. An alternative embodiment is shown in FIG. 4 where the vanes 33 do extend all the way to the front edge of cover but at this point, indicated by 34, they have a very low profile. In this embodiment it will be understood that as liquid flows to the left (as seen in the center cell area of FIG. 2) it is first concentrated outside the vanes 33 and then spills over at 34 into the area between the vanes.

Pursuant to a further feature of the invention, means are also provided for concentrating and directing the reverse flow of liquid over the step 26 and around the vent hole extension 28. As shown in FIG. 5 and the lowest cell area of FIG. 2, the cover 12 includes an integral guide vane or rib 35 which extends substantially diagonally across the back side of the cell area from adjacent the back edge of the cover 12 to the step 26. When the back of the battery 10 is tilted down, fluid flows around the rib 35 and then as the back is raised the liquid is directed by the rib over the step 26, and around the forward directing means 30, illustrated here, in the form of ribs 31 like in FIG. 3a. It will be appreciated that a rib similar to the rib 35 could also be formed in the back side of the central cell area shown in FIG. 2, or in the right-hand portion of the individual cell areas shown in FIGS. 6, 9 and 11 discussed hereafter. Such a rib is not necessary, however, in the uppermost cell area of FIG. 2 since the recessed portion 20 containing the post 18 forms a platform 36 higher than the shoulder 26 when the cover is inverted (see FIG. 3b).

Referring now to FIGS. 6-8, another embodiment of the guide means 30 is illustrated. As shown here, a single rib 37 is integrally formed in the front portion of the cell area extending from the front edge of the cover 12 to the collar 27 surrounding the vent hole 13. To prevent liquid concentrated by the rib 37 from flowing past one side of the vent hole, an upstanding barrier 38 is integrally formed between the vent hole extension 28 and the portion of the cover defining the side wall of the cell area (see FIG. 8). In the embodiment shown in FIGS. 9 and 10, the rib 39 is similar to the rib 37 in FIGS. 6 and 7 but it does not extend to the edge of the cover as in the case of rib 37.

Yet another embodiment of the invention is illustrated in FIGS. 11 and 12. In this embodiment, the concentrating means 30 includes a series of three integrally formed ribs 40, 41, and 42 which together define progressively smaller channels 43 and 44 leading to the vent hole 13. Thus, fluid is first concentrated in the larger channel 43 and directed over the step 25. Flow from the channel 43 past the vent hole 13 is obstructed by the upstanding rib 41 and the fluid is directed through a notch 45 into the smaller channel 44. Reverse flow in channel 44 is prevented by the rib 42 and the fluid passes over the collar 27 and out the vent opening 13.

From the foregoing it will be appreciated that the present invention provides a simple yet effective means for removing substantially all of the liquid from a battery 10 when it is inverted and rocked from side to side. The liquid concentrating means 30 in the form of one or more ribs directs liquid over the step 25 and collar 27 and out the vent hole 13. An additional rib 35 may be employed in the back side of the cell area to direct the reverse flow of liquid over the step 26 and around the vent extension 28. A plurality of ribs 40, 41 and 42 may be provided to funnel the liquid into smaller and smaller channels 43, 44 leading to the vent hole 13.

I claim as my invention:

1. A cover for the case of an electric storage battery from which liquid is to be drained comprising, means on the inside of the cover engageable with portions of the case for closing one or more cells, means defining a fill and vent opening extending through the cover into each cell area, each of said vent openings including an annular collar projecting into the cell, and guide means including at least one internal rib on the inside of the cover within individual cell areas for concentrating and directing liquid over said collar and into the vent opening when the battery case is inverted and rocked from side to side.

2. A cover as defined in claim 1 wherein each vent opening includes an integral extension projecting into the cell from a portion of the circumferential edge of the vent opening and said guide means includes at least one internal rib extending from adjacent one side of the cover to said vent opening opposite said extension.

3. A cover for the case of an electric storage battery from which liquid is to be drained comprising, means on the inside of the cover engageable with portions of the case for closing one or more cells, means defining a fill and vent opening extending through the cover into each cell area, said vent openings being disposed in a recessed channel-like portion of the cover which presents a raised step on the inside of the cover when the battery case is inverted, and guide means including at least one internal rib on the inside of the cover within individual cell areas, said rib extending from adjacent one side of the cover and over said raised step for directing liquid to the vent opening when the battery case is inverted and rocked from side to side.

4. A cover as defined in claim 3 wherein said guide means includes at least one other internal rib for concentrating and directing the flow of liquid from the other side of the cover over said raised step and around the vent opening.

5. A cover for the case of an electric storage battery from which liquid is to be drained comprising, means on the inside of the cover engageable with portions of the case for closing one or more cells, means defining a fill and vent opening extending through the cover into each cell area, and guide means including a pair of internal ribs on the inside of the cover within individual cell areas, said ribs having a portion thereof converging into a narrow channel leading toward the vent opening for directing liquid to the vent opening when the battery case is inverted and rocked from side to side.

6. A cover for the case of an electric storage battery from which liquid is to be drained comprising, means on the inside of the cover engageable with portions of the case for closing one or more cells, means defining a fill and vent opening extending through the cover into each cell area, and guide means including a plurality of internal ribs on the inside of the cover within individual cell areas, said ribs defining a series of progressively smaller channels leading to the vent openings for directing liquid to the vent opening when the battery case is inverted and rocked from side to side.

7. A cover for the case of an electric storage battery from which liquid is to be drained comprising, means on the inside of the cover engageable with portions of the case for closing one or more cells, means defining a fill and vent opening extending through the cover into each cell area, and guide means including an upstanding rib on the inside of the cover which together with one of the walls closing the cell forms a channel leading to the vent opening on the inside of the cover within individual cell areas for directing liquid to the vent opening when the battery case is inverted and rocked from side to side.

8. A cover as defined in claim 7 including a barrier interconnecting said one wall and an extension of the vent opening to obstruct the flow of liquid past the vent opening along said one wall.

* * * * *